(12) United States Patent
Steger et al.

(10) Patent No.: US 11,572,471 B2
(45) Date of Patent: Feb. 7, 2023

(54) DRILL CUTTINGS REUSE IN ROOFING MATERIALS

(71) Applicant: RECOVER ENERGY SERVICES INC., Calgary (CA)

(72) Inventors: Greg Steger, Calgary (CA); Brian Coston, Calgary (CA); Stan Ross, Cochrane (CA)

(73) Assignee: RECOVER ENERGY SERVICES INC., Calgary (CA)

( * ) Notice: Subject to any disclaimer, the term of this patent is extended or adjusted under 35 U.S.C. 154(b) by 356 days.

(21) Appl. No.: 15/985,185

(22) Filed: May 21, 2018

(65) Prior Publication Data

US 2018/0340069 A1    Nov. 29, 2018

Related U.S. Application Data

(60) Provisional application No. 62/510,490, filed on May 24, 2017.

(51) Int. Cl.
| | |
|---|---|
| *C10C 3/00* | (2006.01) |
| *C08L 91/00* | (2006.01) |
| *C08L 95/00* | (2006.01) |
| *C04B 26/26* | (2006.01) |
| *B09C 1/08* | (2006.01) |
| *C04B 18/04* | (2006.01) |

(Continued)

(52) U.S. Cl.
CPC ............. *C08L 91/00* (2013.01); *B09B 3/25* (2022.01); *B09C 1/08* (2013.01); *C04B 18/049* (2013.01); *C04B 26/26* (2013.01); *C08L 95/00* (2013.01); *C10C 3/002* (2013.01); *C04B 2111/00586* (2013.01); *C08L 2555/34* (2013.01); *Y02W 30/91* (2015.05)

(58) Field of Classification Search
CPC ......... C10C 3/00; C08L 95/00; C04B 18/049; E21B 7/18; C09K 8/02; B09C 1/00; B01C 2101/00
See application file for complete search history.

(56) References Cited

U.S. PATENT DOCUMENTS 4,101,172 A * 7/1978 Rabbitts .................. E21B 43/24
166/271
4,235,728 A * 11/1980 Schulz ..................... C09K 8/22
562/410

(Continued)

FOREIGN PATENT DOCUMENTS

| | | |
|---|---|---|
| CN | 105712681 | 6/2016 |
| WO | 2015/156679 | 10/2015 |

*Primary Examiner* — Alexandra M Moore
(74) *Attorney, Agent, or Firm* — Greenblum & Bernstein, P.L.C.

(57) ABSTRACT

A process for the reuse of oilfield drilling waste with an natural affinity for oil which has had at least a portion of the contaminants removed using a remediation technology. The drilling waste can be further refined to ensure the waste meets a desired particle size distribution and thereafter sent for reuse by mixing the drilling waste with hot bituminous tar and thereafter using the liquids phase in roofing materials. A method of mixing the drilling waste with conventional fillers is also described to create a blended mixture of drilling waste and conventional fillers to create a new hybrid filler which is mixed with hot bituminous tar for use in roofing materials.

5 Claims, 7 Drawing Sheets

(51) Int. Cl.
*B09B 3/25* (2022.01)
*C04B 111/00* (2006.01)

(56) References Cited

U.S. PATENT DOCUMENTS

| | | | | |
|---|---|---|---|---|
| 4,836,302 A | * | 6/1989 | Heilhecker | B01D 11/028 |
| | | | | 175/66 |
| 4,895,754 A | * | 1/1990 | Graham | C08K 9/04 |
| | | | | 106/281.1 |
| 7,594,996 B2 | * | 9/2009 | Colic | B01D 17/047 |
| | | | | 208/391 |
| 8,007,581 B2 | | 8/2011 | Scott et al. | |
| 8,591,646 B2 | * | 11/2013 | Monte | C04B 26/02 |
| | | | | 106/281.1 |
| 8,945,443 B2 | * | 2/2015 | Garrick | E21B 41/005 |
| | | | | 264/37.29 |
| 2004/0144405 A1 | * | 7/2004 | Garrick | B01D 17/048 |
| | | | | 134/25.1 |

* cited by examiner 212　　　　　　　　　213　　　　　　　　　214

Unstabilized drill　　Sawdust　　　　Stabilized drill
cuttings　　　　(stabilizing material)　cuttings

315

Cleaned (OBM) Drilling Waste

DRILL CUTTINGS REUSE IN ROOFING MATERIALS

CROSS-REFERENCE TO RELATED APPLICATION

This Application is a non-provisional application that claims the benefit under 35 U.S.C. § 119(e) of U.S. Provisional Application No. 62/510,490 filed May 24, 2017, the disclosure of which is expressly incorporated by reference herein in its entirety.

TECHNICAL FIELD

The field of art to which this invention generally pertains is the processing and treatment of drilling waste.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based or brine based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contaminated.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies such as thermal extraction, solvent washes, mechanical separators, and the increasing cost of drilling fluids, the ability to, and benefits of, reclaiming and reusing the drill cuttings waste would be environmentally and economically advantageous.

Accordingly, there is a constant search for new technologies and improvements to existing technologies to increase the efficiency and effectiveness of recycling initiatives in this area.

BRIEF SUMMARY

A process of making tar material is described including collecting drilling waste solids at least partially contaminated with oil base drilling fluid, the drilling waste solids being of a substantially uniform particle size, mixing the drilling waste solids with hot bituminous tar to create a viscous hot bituminous tar liquids phase, the mixture comprising not greater than 72% by weight drilling waste solids and not less than 28% by weight hot bituminous tar liquids phase and, the resulting mixture being particularly adapted for use in roofing materials.

Additional embodiments include: the process described above where the drilling waste solids have been previously processed using one or more solids-liquids separating devices; the process described above where the solids-liquids separating devices comprise one or more of a shale shaker, a horizontal decanter centrifuge, and/or a vertical cuttings drier; the process described above where the drilling waste solids have been previously washed by a diluent wash process; the process described above where the drilling waste solids have been previously dried using a thermal solids dryer; the process described above where the drilling waste solids have been previously processed using a low temperature thermal processor; the process described above where the low temperature thermal processor is a rotomill or hammermill; the process described above where the low temperature thermal processor operates under negative air pressure; the process described above where the drilling waste solids are milled to a consistent substantially uniform particle size prior to mixing the drilling waste solids with hot bituminous tar; the process described above where the drilling waste solids have a D50 particle size of less than 1000 microns; the process described above where the drilling waste solids have a D50 particle size of less than 250 microns; the process described above where the drilling waste solids have a D50 particle size of less than 100 microns; the process described above where the drilling waste solids have a D50 particle size of less than 50 microns; the process described above where the resulting mixture has a viscosity of greater than 100 cP; and the process described above where the resulting mixture has a viscosity of greater than 200 cP.

A process of making tar material is also described including collecting a first phase of drilling waste solids at least partially contaminated with oil base drilling fluid, the first phase of drilling waste solids being of a substantially uniform particle size, mixing the first phase of drilling waste solids with a second phase of solids to create a hybrid blended solids filler phase, the second phase consisting of one or more conventional solids fillers commonly used in roofing products, with a particle size substantially the same as the particle size of the first phase of drilling waste solids, mixing the hybrid blend with hot bituminous tar to create a viscous hot bituminous tar liquids phase, the resulting mixture being particularly adapted for use in roofing materials.

Additional embodiments include: the process described above where the second phase of solids fillers comprise calcium carbonate, limestone, dolomite, nepheline syenite, and/or barite; the process described above where the hybrid solids filler phase comprises up to 4 parts (by weight) and the drilling waste solids comprises at least 1 part (by weight); the process described above where the drilling waste solids comprises up to 4 parts (by weight) and the hybrid solids filler phase comprises at least 1 part (by weight); the process described above where the drilling waste solids have been previously processed using one or more solids-liquids separating devices; the process described above where the solids-liquids separating devices comprise one or more of a shale shaker, a horizontal decanter centrifuge, and/or a vertical cuttings drier; the process described above where the drilling waste solids have been previously washed by a diluent wash process; the process described above where the drilling waste solids have been previously dried using a thermal solids dryer; the process described above where the drilling waste solids have been previously processed using a low temperature thermal processor; the process described above where the low temperature thermal processor is a rotomill or hammermill; the process described above where the low temperature thermal processor operates under negative air pressure; the process described above where the drilling waste solids are milled to a consistent substantially uniform particle size prior to mixing the drilling waste solids with hot bituminous tar; the process described above where the drilling waste solids have a D50 particle size of less than 1000 microns; the process described above where the drilling waste solids have a D50 particle size of less than 250 microns; the process described above where the drilling waste solids have a D50 particle size of less than 100 microns; the process described above where the drilling waste solids have a D50 particle size of less than 50 microns; the process described above where the resulting mixture has a viscosity of greater than 100 cP; and the process described above where the resulting mixture has a viscosity of greater than 200 cP.

These, and additional embodiments, will be apparent from the following descriptions.

DETAILED DESCRIPTION

Figure 1:
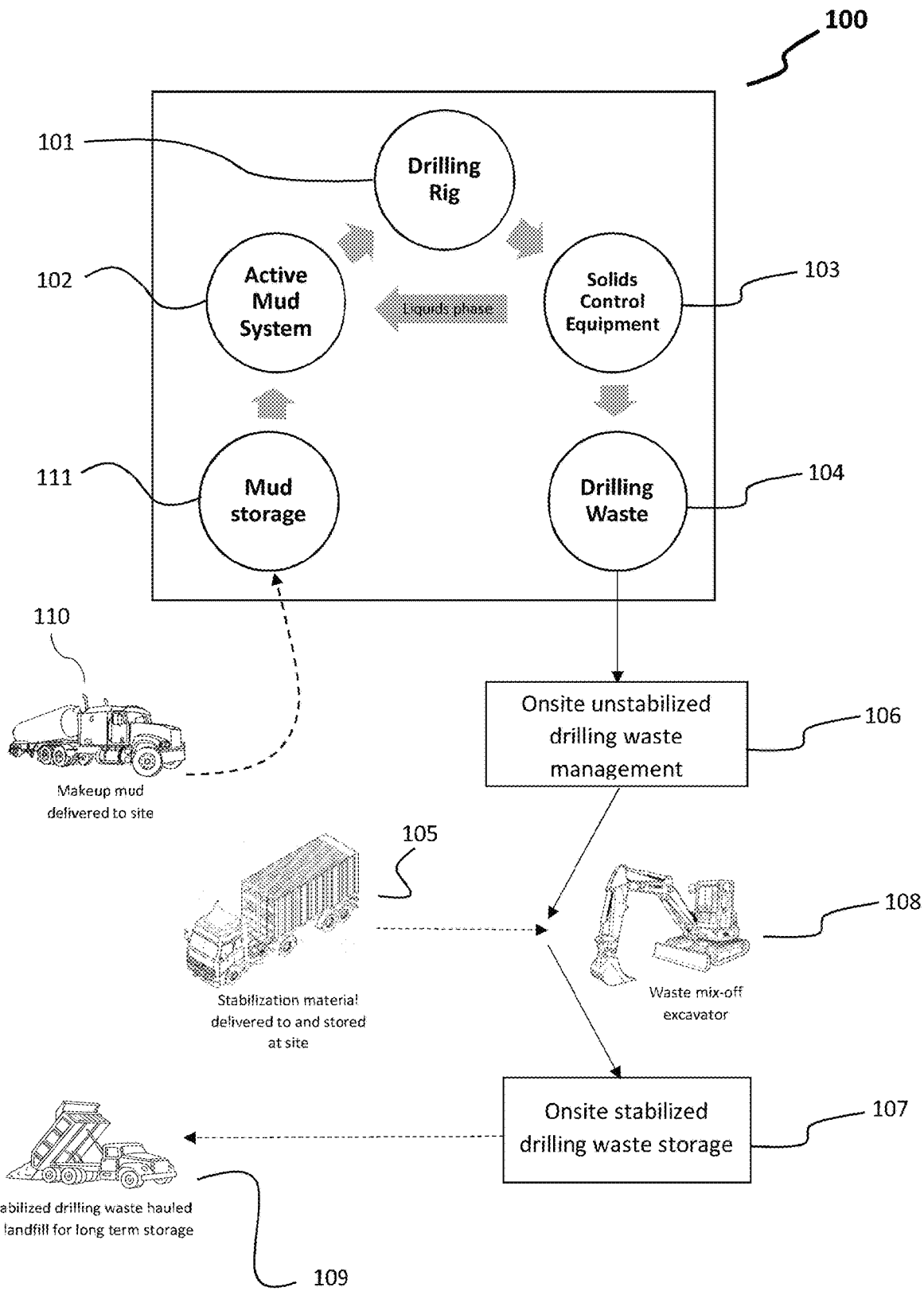
FIG. 1 demonstrates an embodiment of a typical drilling rig fluids and solids operations onsite management system.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

The following terminology is included for ease of understanding:

Drilling fluid—used in the drilling industry to carry the drill cuttings/solids phase (rock, clay, shale, etc.) broken up by the drill bit out of the well bore. Drilling fluid (also known as drilling mud) consists of a base fluid with additives which can include liquids or solids or both, which give the drilling fluid properties necessary for effective use as a drilling mud.

Oil based mud—(OBM) also known as Invert, is a type of drilling fluid that uses oil as the base ingredient and it typically consists of a mixture of oil, emulsified water and drilling mud additives which might be solids or liquids or both. OBM's typically consist of distillates or synthetic oil as the base fluid. Conversely, water based mud is a drilling fluid that uses water as the base ingredient, mixed with liquids or solids or both. Common types of water base muds are gel-chem mud systems, brine mud systems or polymer mud systems.

Solid-Soil Matrix is used to reference an earthen material that is contaminated with an undesired substance. Typically, contaminants have at least a moderate toxicity value and limitations of discharging the contaminant are managed according to local, state or federal regulations.

Particle size distribution is also known as the median diameter (D50) or the medium value of the particle size distribution. It is the value of the particle diameter at the percent (e.g., 50%) in the cumulative distribution. For example, if the "D50" is 5 microns, then 50% of the particles have a diameter greater than 5 microns and 50% of the particles have a diameter less than 5 microns.

With a focus on environmental standards around the globe, efforts have been made to more effectively remediate waste streams or contaminated sites either quicker, or more effectively, or at a lower cost. One such example of a waste stream that is currently deposited into industrial landfills for long term storage is drilling waste. FIG. 1 illustrates how drilling waste is typically managed on an onsite drilling location (100). A drilling rig (101) uses drilling mud (102) to carry contaminated solids to surface where the solids control equipment (103) removes the free liquids. The drilling waste (104) ejected from the solids control equipment typically contains 10 to 25% liquids (by weight (wt.)) and 75 to 90% solids (by wt.) and it is stored in onsite tanks (106). A bulking agent, for example sawdust, is delivered to site (105) and mixed with the drilling waste and further stored in onsite storage containers (107), until such time that a full load has accumulated. An excavator (108) then loads a transport truck which hauls the waste to a landfill (109) for long term storage. Given at least a portion of the drilling mud is lost to the drilling waste, replacement drilling fluid is hauled back to site (110) and stored (111) for future use.

Figure 2:
FIG. 2 demonstrates unstabilized drill cuttings, stabilizing (or bulking) agent, and stabilized drill cuttings (ready for long term storage in a landfill) respectively.

FIG. 2 includes three pictures to illustrate drilling waste practices. The first picture shows drilling waste which is unstabilized, contaminated with oil base mud (212). The second picture shows sawdust stabilization material (213). The third picture shows stabilized drilling waste (214) ready for transport and long term storage at a landfill.

With the significant cost of drilling muds and liabilities associated with long term storage of drilling waste, there has been research and development to most effectively recover as much of the drilling mud as possible, by using solids separating devices or fluids rehabilitation devices. Such systems include shale shakers, centrifuges, centripetal dryers, thermal extraction systems or diluent washing systems. Technologies such as the aforementioned thermal or diluent washing methods can consistently produce a solids phase which is substantially free of residual hydrocarbons and water.

Publication number WO2015156679 A1 demonstrates the use of a Thermomechanical Cuttings Cleaner (TCC®) to remove hydrocarbons and water from drilling waste by creating heat through friction, within a negative pressure chamber. The heat induced by high speed rotating paddles causes the fluids phase to evaporate where it can be recovered for reuse. Reported analytical has shown that recovery of the liquids phase can leave as little as 1% (by wt.) residual hydrocarbons.

Figure 3:
FIG. 3 demonstrates drilling waste which has been subjected to a diluent wash process (and contains in this instance approximately 1% by weight residual hydrocarbons).

Commonly assigned co-pending US Patent Applications Ser. Nos. 62/303,163; 62/303,169; 62/303,172 and 62/416,952 the disclosures of which are herein incorporated in their entirety by reference, disclose methods of mixing a miscible diluent with unstabilized drill cuttings to allow the diluent to dissolve in the contaminant, thereby altering the rheology of the hydrocarbon contaminant. The washing mechanism permits additional solid phase-liquid phase interaction moments as the solids phase and liquids phase are separated. The liquid phase mixture is moved to one or more fluids rehabilitation processes where the diluent is evaporated, condensed and reused in the wash process, and the oil phase is reused as a drilling fluid base. The solids phase mixture is moved to an operatively connected process for residual solvent extraction, for example, a solids dryer. FIG. 3 is a picture of drilling waste which has been washed using a diluent washing process (315). Field tests have shown that recovery of the liquids phase can leave as little as 1% (by wt.) residual hydrocarbons.

The above referenced documents are only a few of the drilling waste treatment technologies available.

Successes with recovering the contaminants in drilling waste have yielded another product capable of being reused. The cleaned drilling waste itself is generally dry, granular and other than residual chlorides, considered benign.

Methods to reuse cleaned or partially cleaned drilling waste have been developed over time. Texas is one jurisdiction where using cleaned drilling waste for road construction has been tried, despite the residual chlorides content. The solids phase is placed on top of a road base and compacted. Asphalt can then be added over the cleaned drill cuttings to complete a roadway. Long term effects of this reuse initiative are still being monitored.

U.S. Pat. No. 8,007,518 discloses how cuttings can be incorporated into useful, high quality load-bearing structures such as vehicle roads and pads for deep drilling rigs. This process recycles a material previously regarded as valueless at best and more often, a legacy liability. The cuttings, optionally mixed with drilling mud and/or soil, are converted to the useful structures by pozzolanic and/or cementitious reactions after being mixed with suitable other materials and/or are bonded into the useful structures by asphaltic materials. In some jurisdictions such Alberta, Canada, the regulating body often rejects reuse efforts like that mentioned in U.S. Pat. No. 8,007,581 because the environmental regulator does not permit the reuse of materials previously categorized as 'drilling waste' which could result in potential legacy liabilities.

U.S. Pat. No. 8,945,443 discloses using cleaned drill cuttings as a plastic filler to both reduce the volume of recycled plastic required and provide at least a partial increase in strength of the resulting plastic product. While any reasonable effort to reduce, reuse and recycle is encouraged, commercial possibilities for the resulting plastic product is likely limited to simple consumer items like benches, decking or planters. Further, while plastic products are normally white, the addition of cleaned cuttings will cause the recycled plastic product to be take a grey or brown hue which could give the user a lessor impression of the product.

Commonly assigned U.S. Patent Application Ser. No. 62/379,437, the disclosure of which is herein incorporated in its entirety by reference, discloses recovering weight material for reuse in drilling fluids from a previously unavailable source of feed stock. The process described involves cleaning drilling waste through either low temperature thermal or solvent washing to remove hydrocarbon or water based drilling fluid contamination. The cleaned drilling waste, substantially free of liquids is sifted and the bulk fraction is further treated by employing conventional separation technology to recover a high gravity solids phase while discarding low gravity solids phase as tailings. The recovered high gravity solids phase can be reused as a high-density weight material, or lower cost weight material, either of which is desirable to the drilling of modern oil and gas wells.

Roofing material manufacturing follows strict quality control guidelines because most roofing materials come with extended warranties for the consumer. As such, lower micron solids (for example, a D50 of less than 1000 microns) are particularly useful with this embodiment because smaller solids create a uniformly consistent product, during the manufacturing process. The more uniform and consistent the materials of construction, the more the manufacturer can be certain of a controlled product quality at the point of sale. However, a fixed volume of lower micron solids naturally have more surface area than fewer, larger solids occupying the same fixed volume, as illustrated in Table 1.

TABLE 1

Illustrates how surface area is affected by particle size

| | Surface area (square centimeters) | Number of balls in a 10 cm × 10 cm × 10 cm cube (1000 cm$^3$) | Total surface area (square centimeters) |
|---|---|---|---|
| Tennis balls (diameter 6.5 cm) | 128.6 | 1 | 128.6 |
| Marbles (diameter 1.1 cm) | 5.1 | ~641 | ~3,250 |

In most if not all bituminous containing roofing materials, a filler is added to the bituminous component to give the tar liquid specific properties which make the liquid useful as a component of roofing materials. The addition of fillers can be a significant portion of the hot bituminous tar phase for example, typically not less than 28% by volume, more typically in the range of 60% to 70% by volume, and typically greater than 72% (of the whole volume of filler and hot bituminous tar). Thus, the low micron solids effectively displace a portion of the bituminous tar, thereby lowering the cost of the more expensive asphaltene phase.

Wettability of the solids filler is a significant concern. If the low micron solids are not easily wetted by the liquids phase (in this case, hot bituminous tar) the preparation time either increases or the uniformity of the mixture is compromised. Some fillers are preferred more than others because of:
 a) filler availability, which affects transportation costs; and,
 b) filler consistency, which affects quality control of the roofing materials; and,
 c) filler cost, which affect the product development costs; and,
 d) filler reactivity (for example, a preferred pH in the range of 6 to 9), which can affect the durability and overall quality control of the roofing materials; and,
 e) a natural affinity for oil, as opposed to an affinity for water, which affects the wettability of the solids phase and economics of the process, or quality control of the roofing materials.

U.S. Pat. No. 4,895,754 addressed oil affinity by treating a lower cost mineral solid (than that of a preferred filler, for example limestone), so it develops an affinity for oil. Mineral fines lacking a natural affinity for oil were pre-coated with oil so that they could transition to become oil wet. Therefore, when the pre-coated solids phase was added to hot asphalt, the compatibility was nearly instantaneous and the solids loading capabilities of the mineral solids mimicked that of other low micron solids with a natural affinity for oil. To use recycled mineral solids that are naturally oil wet (and otherwise a waste and economic liability) would be extremely advantageous.

The processes disclosed herein describe recycling low micron sized drill cuttings waste (for example, solids generally comprised of dolomite, carbonates, barite, quartz, feldspar, chlorites, among other constituents including at least a portion of residual hydrocarbon contamination, the sample as a whole typically having a pH of greater than 7.0 and less than 9.0), or a blend of low micron drill cuttings waste and equally sized conventional fillers (for example, dolomite, calcium carbonate, nepheline syenite, barite, limestone, among others, the filler having a pH of greater than 7.0 and less than 9.0), as a filler in the hot bituminous tar, used to manufacture roofing materials (for example, roofing shingles, adhesives and sealants). Those knowledgeable in this area will recognize that the conventional filler is a solids phase otherwise commercially available and marketed as a filler material and not just limited to the aforementioned solids filler mentioned above.

Figure 4:
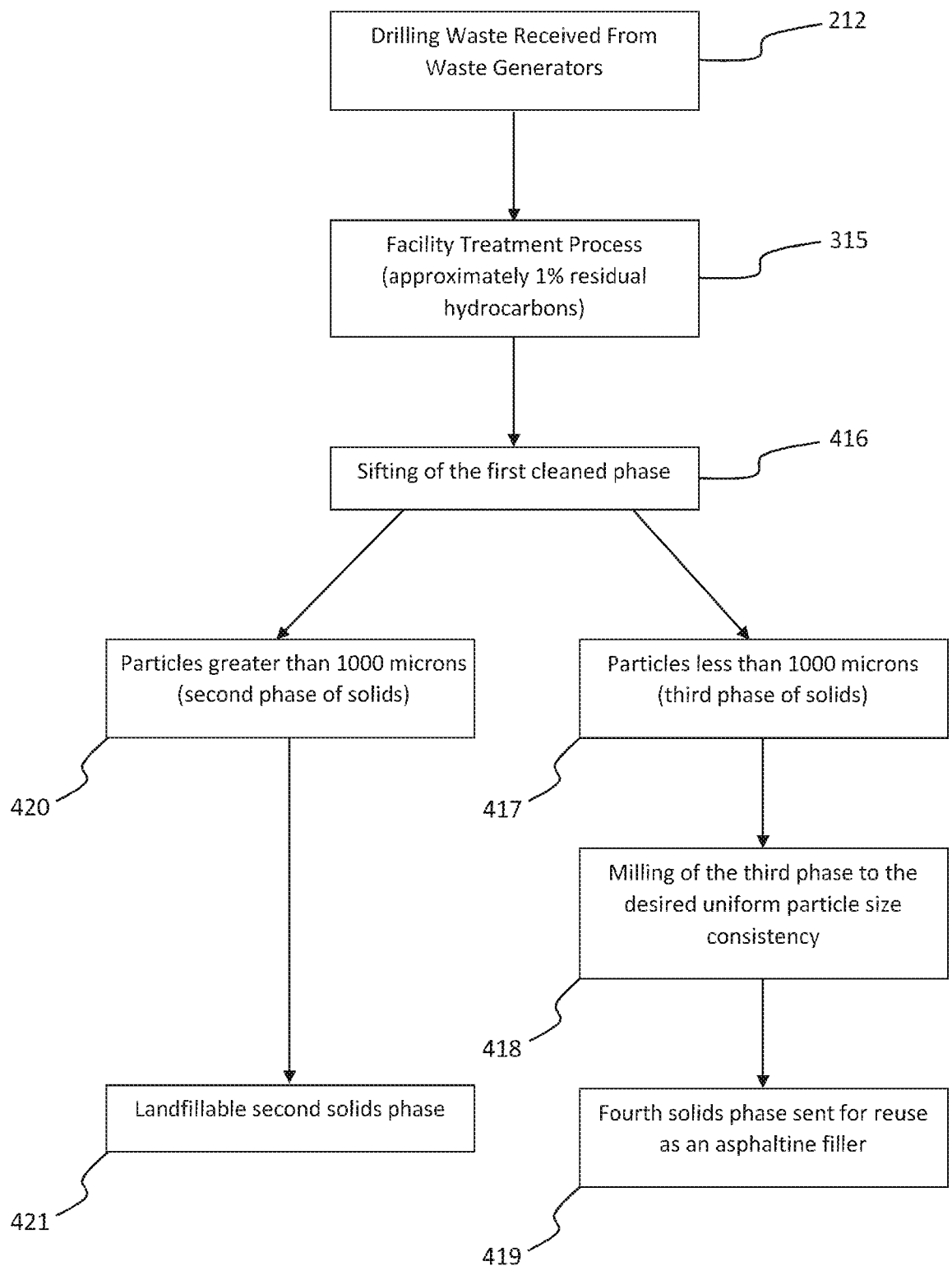
FIG. 4 demonstrates a process flow chart illustrating a process of recycling drilling waste as an asphaltene filler.
Figure 5:
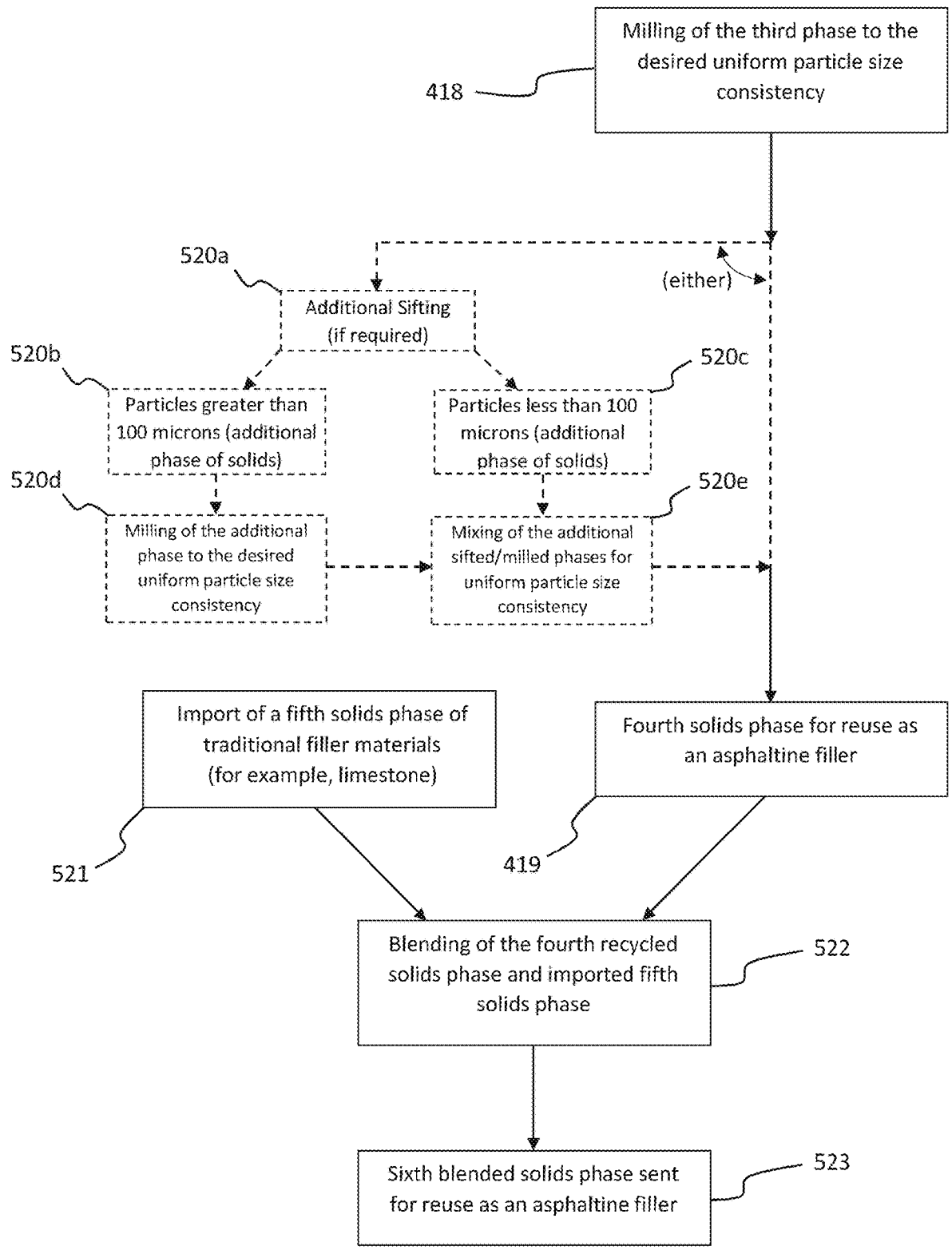
FIG. 5 demonstrates an alternate process flow chart illustrating additional processing steps to generate uniform and consistent particle size of the drilling waste.

FIG. 4 and FIG. 5 further illustrate the processes and methods described herein.

Drilling waste (212) particle size can vary from as little as less than one micron, to pieces several centimeters in diameter. FIG. 3 is a picture of cleaned drilling waste (315) and the diversity of larger and smaller pieces in the sample is visually obvious. Given conventional fillers are substantially uniform in particle size as opposed to being diverse in particle size, the cleaned drilling waste must be presented substantially equal in particle size. Ideally, the first cleaned solids phase is sifted (416) to remove a second phase of larger pieces for example, greater than 1000 microns (420), and a third phase of smaller particles for example, less than 1000 microns (417), by means of either a pneumatic sluice or through mechanical sifting. This would permit the operator of the recovery process to selectively mill (418) the third phase of smaller particles (417) to a D50 particle size of 250 microns, or 100 microns, or 50 microns for example, in an effort to mitigate additional milling costs of the whole first phase, prior to using the fourth phase of solids as an asphaltene filler (419). The solids phase which is discarded (420) is sent to landfill (421) for final disposition.

Generally, the drilling waste itself is largely extracted from deep shale formations in the earth (for example, greater than 500 meters below earth's surface). Shales are essentially a mixture of minerals and clays and when they are cleaned, they become very brittle, so it's expected that the milling process itself will be substantially easier than milling other mined (virgin) minerals, to achieve a specific particle size. Milling is the mechanical process of breaking, separating, grinding, crushing, cutting, sizing or classifying aggregates. Those knowledgeable in this area will realize that milling of the solids phase can occur (in part) as a result of the contaminant removal process and as additionally necessary, utilizing commercially available milling equipment such as a Ball mill, Rod mill, SAG mill, Pebble mill, Buhrstone mill, Vertical shaft impactor mill or Tower mill, among others.

Figure 6A:
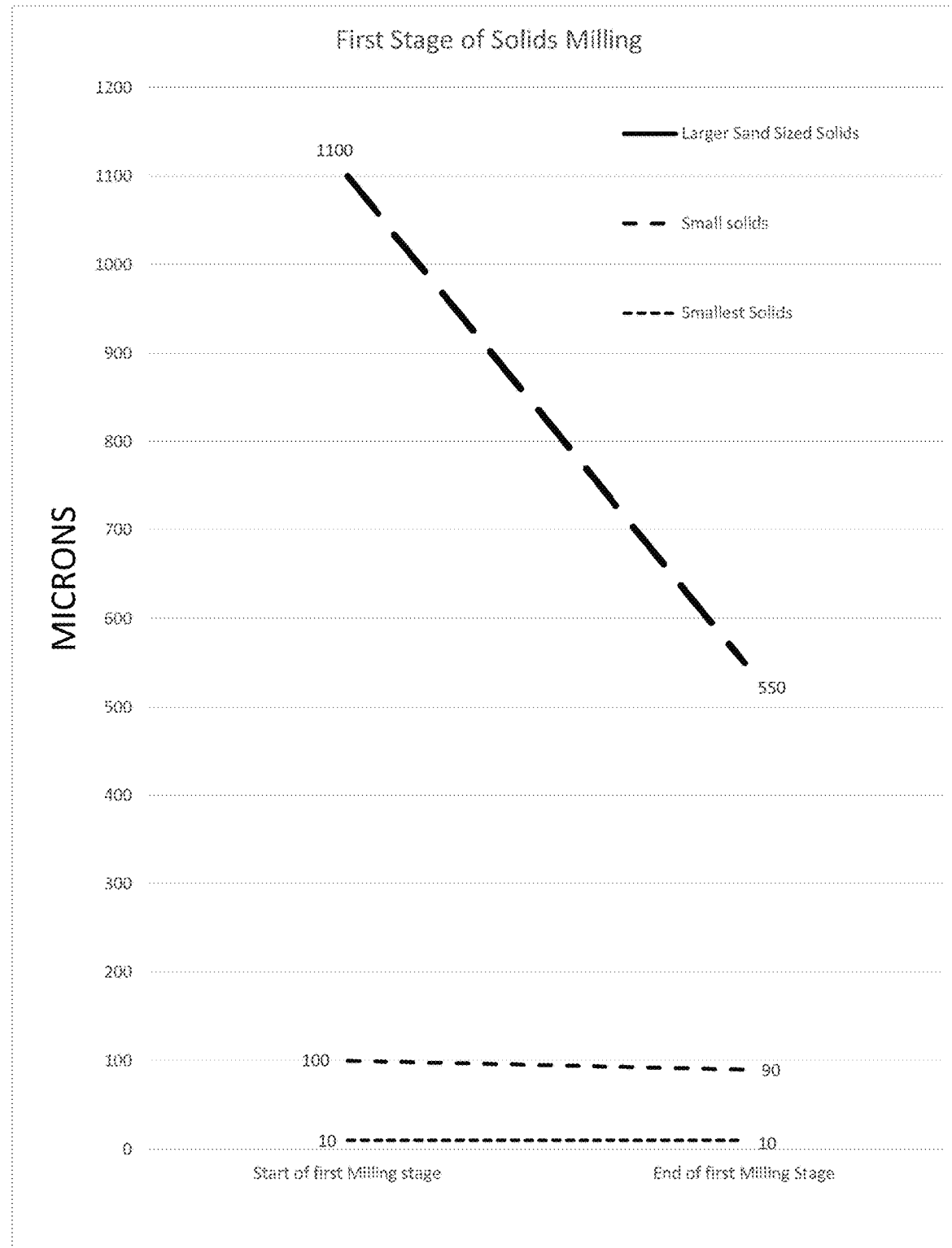
FIG. 6A is a chart demonstrating how larger or smaller micron sized particles may independently degrade during the process of milling.
Figure 6B:
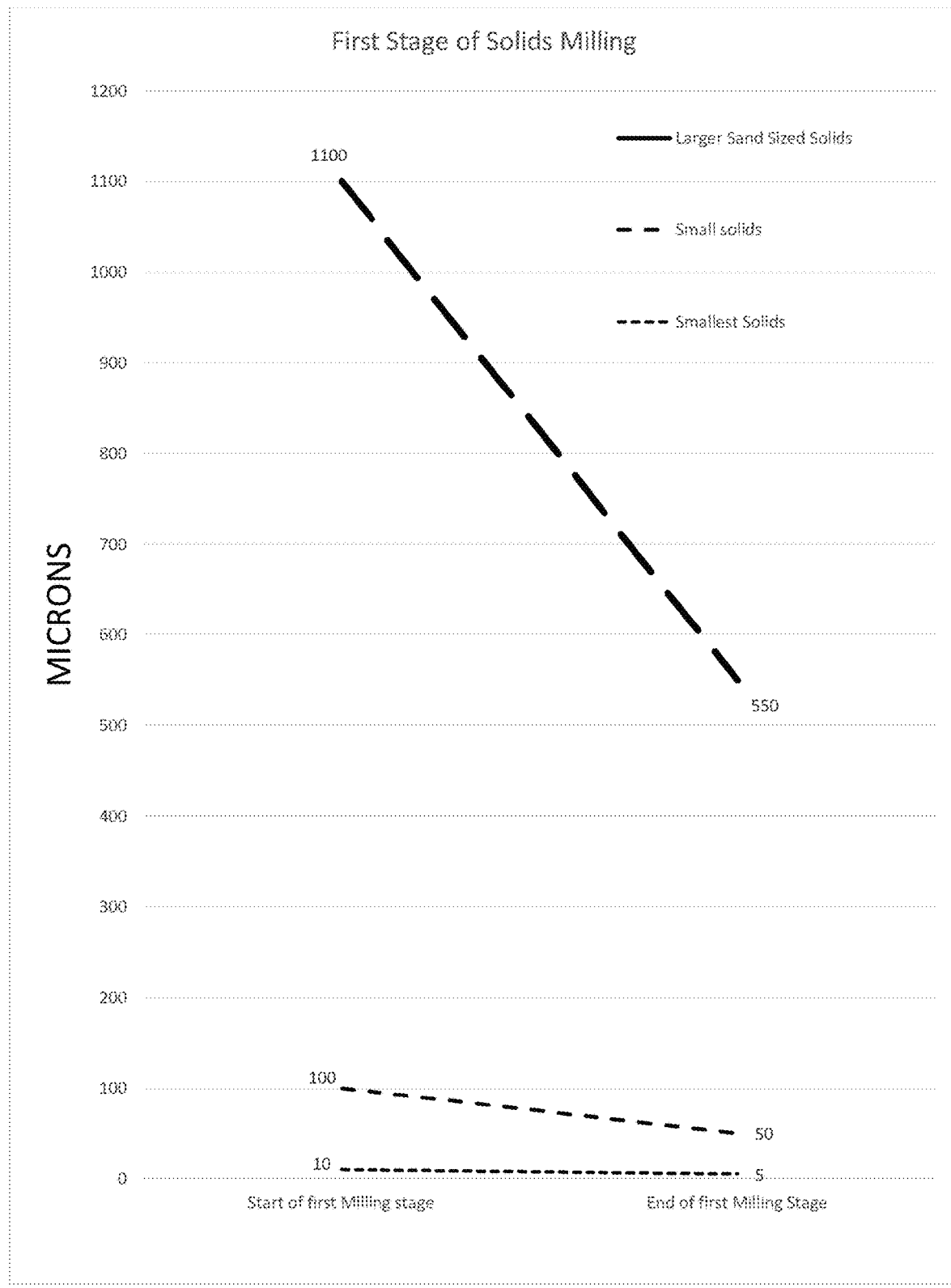
FIG. 6B is a chart demonstrating how larger or smaller micron sized particles may simultaneously degrade during the process of milling.

FIGS. 6A and 6B illustrate the possible degradation of solids during a milling process.

While other methods of removing hydrocarbons from drilling waste can yield a solids phase that is at least partially acceptable for reuse as an asphaltene filler, the drilling waste described herein has been processed using a solvent wash technique (which in and of itself, substantially degrades the particle size to a D50 of approximately 45 microns) and thereafter, subjected to sifting using mesh bottom sieves. When implemented on a commercial scale, empirical data will determine if a first effort of milling the solids phase results in either:
 a) larger solids degrading to become smaller solids while smaller solids remain substantially uniform in size (further illustrated in FIG. 6a); or,
 b) larger solids degrading to become smaller solids while smaller solids simultaneously degrade to become even smaller solids (further illustrated in FIG. 6b).

FIG. 6a illustrates the expected degradation of solids by process of milling (418) wherein larger solids are expected to degrade to become substantially similar in size to smaller solids (which are largely unaffected by the first stage of milling) at which time, all solids will begin degrading into smaller particles simultaneously. However, FIG. 6b illustrates another possible outcome resulting from the milling process (418). If empirical data shows that all drilling waste particles simultaneously and proportionally degrade into smaller particles at the same rate for example, 1100 micron solids become 550 micron solids, while 100 micron solids become 50 micron solids, while 10 micron solids become 5 micron solids, while 1 micron solids become 0.5 micron solids (hereinafter referred to as sub-micron solids), and these sub-micron solids are found to be a detriment to the reuse of drilling waste in roofing materials, the operator may choose to further separate the third solids phase to create an additional sifted solids phase (520a) consisting of particles greater than 100 microns (520b) for example, and an additional solids phase of less than 100 microns (520c), further illustrated in FIG. 5. This would permit the operator to mill (520d) the particles greater than 100 microns (520b) to a consistency of less than 100 microns and thereafter mix the smaller micron solids phases so to ensure the mixed phases of solid particles (520e) are substantially similar in size, prior to reuse as an asphaltene filler (419).

Recycling low micron drilling waste in bituminous containing roofing materials is an excellent means of removing additional burden on landfills. However, drilling activity can be cyclical whereas housing construction is generally more consistent. To ensure the availability of drilling waste is reliable, the processes described herein includes the method of mixing/blending (522) a commonly utilized filler material (521) with the drilling waste filler (419) at a volume ratio of 1:4 (as little as one part is commonly utilized filler (521) material and as much as four parts are cleaned drilling waste (419)), to 4:1 (as much as four parts are commonly utilized filler material (521) and as little as one part is cleaned drilling waste (419)). Table 2 illustrates upper and lower volume ratio thresholds of hybrid filler (523) used to make a batch of viscous bituminous tar (or blend of viscous bituminous tar in a continuous process).

TABLE 2

| | Ratio of Fillers (% volume) | |
| --- | --- | --- |
| | Conventional fillers | Cleaned drilling waste fillers |
| Current Practice | 100% | 0% |
| Disclosed Practice | 0% | 100% |
| Disclosed Practice (Using a Hybrid Filler) | 20 to 80% (ratio of 1:4) | 80 to 20% (ratio of 4:1) |

Such a mixture would help alleviate pressure on the suppliers of cleaned drilling waste over a longer period of time, by reducing the volume needed on a shorter term, scheduled basis.

The embodiments described within focuses on the reuse of cleaned drill cuttings and less so on the application of the mixture of hot bituminous tar and cleaned drill cuttings. Application techniques are best known by those knowledgeable in the best practices of manufacturing roofing materials. That said, it is expected that the mixture would be applied at a temperature of approximately 200° C., or a temperature which provides the mixture with a viscosity of greater than 100 cP (centipoise), or greater than 200 cP.

These problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process of making tar material, comprising:
    collecting drilling waste solids at least partially contaminated with hydrocarbon- or water-based drilling fluid contamination,
    processing the drilling waste solids using one or more solids-liquids separating devices to remove the hydrocarbon- or water-based drilling fluid contamination,
    milling the drilling waste solids to a D50 particle size of less than 1000 microns,
    mixing the milled drilling waste solids with bituminous tar to create a viscous bituminous tar liquids phase,
    the mixture comprising not greater than 72% by weight of the milled drilling waste solids and one or more fillers and not less than 28% by weight bituminous tar liquids phase, and
    where the milled drilling waste solids are mixed in a ratio of 1:4 to 4:1 by weight of the one or more fillers,
    the resulting mixture having a viscosity of greater than 100 cP and being adapted for use in roofing materials.

2. The process of claim 1 wherein the drilling waste solids have been previously washed by a diluent wash process and/or previously dried using a thermal solids dryer.

3. The process of claim 1 wherein the drilling waste solids have been previously processed.

4. The process of claim 3 wherein the processing is performed under negative air pressure.

5. The process of claim 3 wherein the drilling waste solids have been previously processed with a rotomill or hanimermill.

* * * * *

UNITED STATES PATENT AND TRADEMARK OFFICE
CERTIFICATE OF CORRECTION

PATENT NO. : 11,572,471 B2
APPLICATION NO. : 15/985185
DATED : February 7, 2023
INVENTOR(S) : G. Steger et al.

It is certified that error appears in the above-identified patent and that said Letters Patent is hereby corrected as shown below:

In the Claims

At Column 10, Lines 50-51 (Claim 5, Lines 2-3) please change "hanimermill" to -- hammermill --.

Signed and Sealed this
Fifth Day of September, 2023

Katherine Kelly Vidal
*Director of the United States Patent and Trademark Office*